March 19, 1946.  H. H. RAPLEY  2,397,044
MEANS FOR ACCURATELY SPACING ARTICLES ON CONVEYERS
Filed July 7, 1944  2 Sheets-Sheet 1
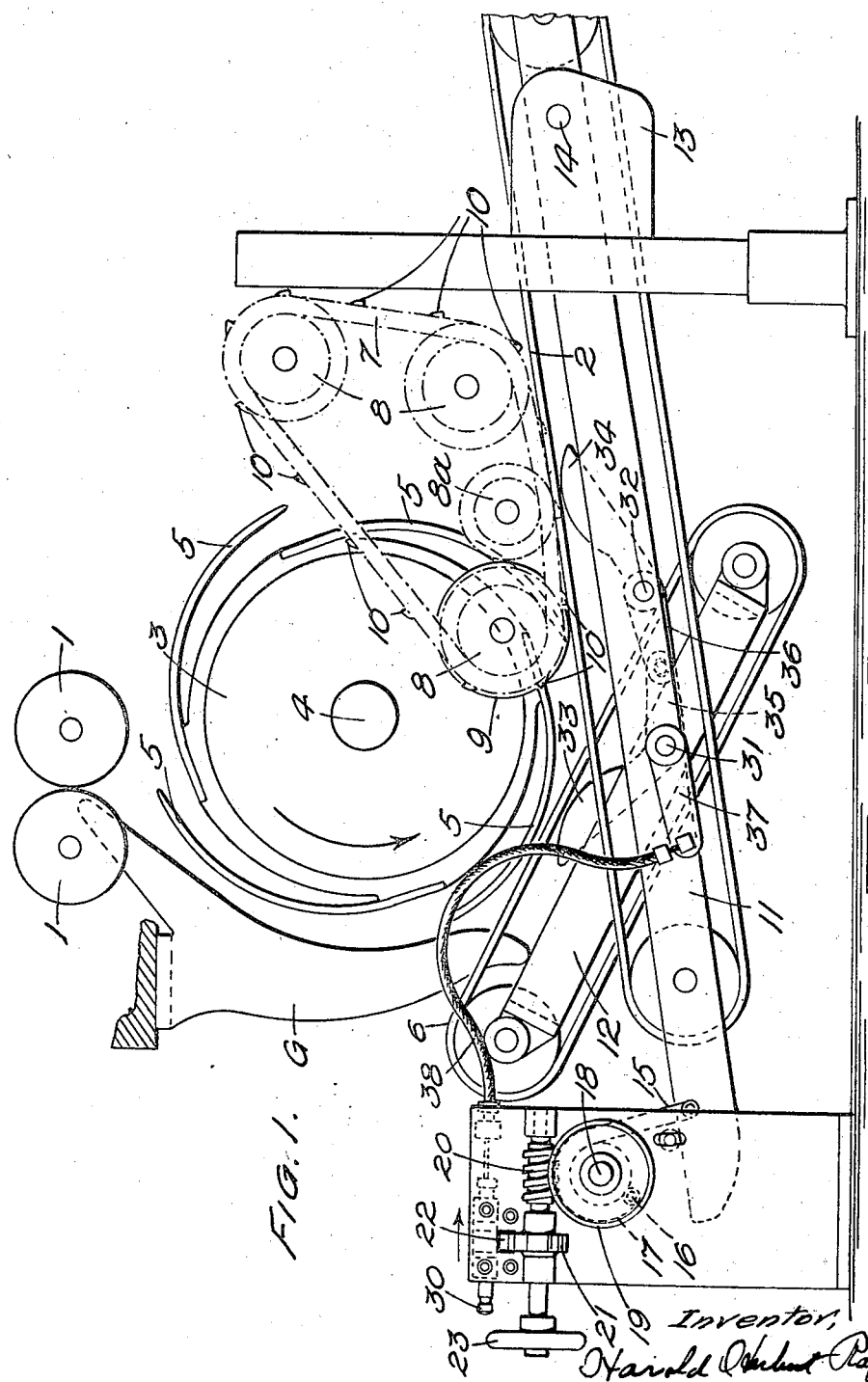

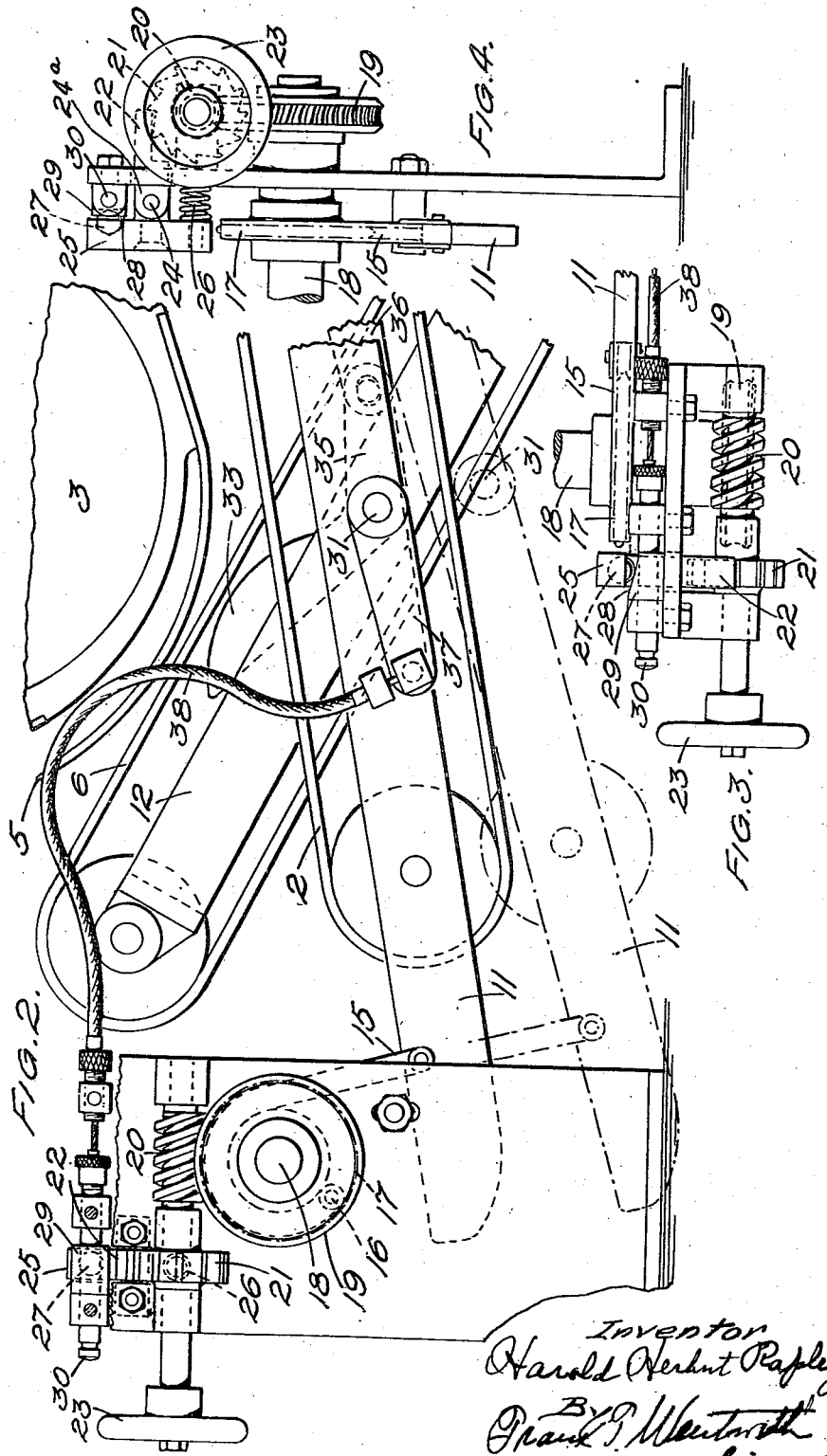

Patented Mar. 19, 1946

2,397,044

UNITED STATES PATENT OFFICE 2,397,044

MEANS FOR ACCURATELY SPACING ARTICLES ON CONVEYERS

Harold H. Rapley, Bedford, England

Application July 7, 1944, Serial No. 543,866
In Great Britain December 11, 1942

8 Claims. (Cl. 271—80)

This invention relates to means for accurately spacing articles on conveyers and refers particularly to means for spacing copies from a printing press on to the fly belt on which they commence their journey to the delivery table.

The invention comprises apparatus for accurately spacing, upon a conveyer, press copies, immediately upon their delivery from a rotating fly having pockets from which the copies are delivered successively as they reach their down position, wherein said copies are spaced by each overtaking and engaging with one of a series of spacing stops travelling beside said conveyer in substantially the same direction.

The invention further comprises in a system of the kind referred to, a conveyer belt section, supporting means for maintaining said conveyer belt section in operative position, and a trigger element, adjacent said conveyer belt section and adapted to be actuated, in response to the articles flexing the belting of said section beyond a given degree, owing to a jam or the like, to trip said supporting means and permit said conveyer belt section to move to an inoperative position, thereby relieving the jam or the like.

In order that the invention may be the more clearly understood, an arrangement in accordance therewith, for delivering copies from a printing press on to a fly belt, will now be described, reference being made to the accompanying drawings wherein:

Figure 1 is a side elevation illustrating a fly belt, and a fly for delivering copies from a printing press on to said fly belt.

Figure 2 is a view to a larger scale of a portion of Figure 1.

Figure 3 is a plan of the left hand end of Figure 2.

Figure 4 is an end view looking from the left of Figure 2.

Referring to the drawings the copies are delivered to the usual folding-off rollers 1 to said fly belt 2 through the medium of a rotating fly. This fly consists, in the known way, of a number of spaced discs 3 (only one of which is of course seen in the elevational drawing) mounted on a common rotatable horizontal shaft 4, each disc having thereon a number of, say four, equally spaced arms 5 which extend from the periphery of the disc at a small angle thereto in the direction opposite to the direction of rotation. The arms 5 of the several discs 3 are at the same rotary spacing, and thus four pockets at 90° to each other will be formed between the arms and the disc peripheries.

As the fly rotates, successive copies from the folding-off rollers 1 located above the fly, are fed into the successive pockets of the fly. The fly belt 2 is located more or less horizontally beneath the fly and travels in the same direction as the arms 5 when at the bottom. Between the fly and the fly belt 2, an intermediate conveyer belt 6 is provided which, moving in the same direction as the fly belt 2 and interleaving said fly belt at a downwardly inclined angle as shown, passes close to the fly at a point of the same approaching the lowermost position.

A number of identical parallel endless chains 7 are provided (only one of which is seen in the elevational view) each running on three sprockets 8. These chain and sprocket arrangements interleave the discs 3 of the fly as shown and one of the sprockets 8 of each chain carries a disc 9 whose circumferential periphery is at a slightly greater radius than the maximum radius of the chain passing over that sprocket. This sprocket 8 is so located that the front edge of the copy in each pocket of the fly will abut against the circumferential peripheries of the discs 9 just about as said pocket reaches its lowermost position. Thus said copy is left behind from said pocket so that it slides smoothly on to said intermediate conveyer belt 6 and fly belt 2 progressively.

The endless chains 7 just in advance of the point where the copies drop on to the fly belt 2, that is commencing from the sprockets 8 associated with the discs 9, run close and parallel to said fly belt 2. The chains 7 run at the same speed and direction as the adjacent fly belt 2 and carry spacing stops 10. The intermediate belt 6 runs at a higher speed than the fly belt 2, and the rate of rotation of the fly is such that the speed of the arms 5 is considerably greater than that of the belt 6. The arms 5 are, in the usual way, curved in the same sense as the peripheries of the discs 3 and the arrangement is such that they pass so close to the intermediate belt 6 that after each copy has been delivered from a pocket on to said intermediate belt and fly belt, the outer side of the arm of the succeeding pocket overtakes and engages the upper surface of said copy. This presses the copy against the intermediate belt 6 and ensures said said copy shall move at least as fast as said intermediate belt. (It may move faster owing to the friction of the arm 5 against it.) Thus the copy must move faster than the fly belt and it will accordingly slide forwardly along said fly belt until its forward edge abuts against the set of spacing stops 10 next in advance of it. Thus when the copies are finally conveyed away by the fly belt they are all equally spaced, in imbricated relation, at intervals determined by the spacing of the sets of spacing stops 10.

The chains 7 are driven from the shaft 4 of the fly and thus the spacing stops 10 will determine the phase, as well as the actual spacing, of the copies with respect to the delivery mechanism of the press. The drive from the shaft 4 of the fly to the chains 7 is by means similar to those described in our prior specification No. 539,126, whereby the phase of the spacing stops with respect to the delivery mechanism of the press can be adjusted while the device is in operation.

It will be appreciated that the introduction of the intermediate belt 6 enables the copies to come to rest on the two belts while still in their natural arc, and thus they hardly have to fall through the air. When the horizontal fly belt is alone as in the present practice, the copies before they take up their position on the fly belt have to fall through the air either at the back or at the front or both to the flat horizontal state, and this in itself is a major cause of uneven spacing. Thus the presence of the intermediate belt tends to space the copies more evenly than heretofore, quite apart from the spacing stops 10. The subsequent action of these latter effects substantially perfect spacing.

The reference 8a designates an idler sprocket for each chain 7 which forces the run of chain adjacent the fly belt 2 slightly out of the straight and enables the spacing stops 10 at the critical point to be sufficiently in the path of the copies while the disc 9 is just clear of the copies.

The reference G designates the usual guide for ensuring retention of the copies in the pockets of the fly until the appropriate point.

It may sometimes happen that a jamming of the copies may occur either between the arms 5 of the fly and the intermediate conveyer belt 6 or between the endless chains 7 and the fly belt 2. In accordance with the present arrangement, to prevent this from doing any damage means are provided whereby, as soon as such jamming begins to take place, the fly belt 2 together with the intermediate conveyer belt 6 is automatically lowered clear of the fly and endless chains.

Thus the pulleys of the fly belt 2 are mounted on a frame 11 extending longitudinally of said fly belt as shown, and the pulleys of the intermediate conveyer belt 6 are mounted on a similar frame 12 extending longitudinally of said belt 6, which frame 12 is rigidly connected to the frame 11. The frame 11 near its forward end is pivoted to a fixed bracket 13 about a horizontal transverse axis 14, and thus the whole unit structure carrying the fly belt 2 and the intermediate conveyer belt 6 can be lowered clear of the fly 3 and endless chains 7 by rotating the frame 11 downwardly about the axis 14.

At the rear end of the frame 11, which extends rearwardly a little beyond the fly belt 2, each side frame member is connected to the lower end of a chain 15 which, at its upper extremity is secured at 16 to a sprocket wheel 17 about which it makes part of a turn. The two sprocket wheels 17 are rigidly mounted on a common shaft 18. Only one frame member chain 15 and sprocket wheel 17 are seen in the drawings but the two sets of these parts are identical.

The shaft 18 has a worm wheel 19 mounted on it which engages with a worm 20, and the shaft of said worm 20 has mounted on it a ratchet wheel 21 which is normally prevented by means of a pawl 22 from rotating in such a direction that the sprocket wheels 17 are permitted to pay out the chains 15 and permit the belt system 2, 6 to lower. The shaft of the worm 20 has a hand wheel 23 mounted on it, and, in practice, this hand wheel is rotated so as to wind the chains 15 on to the sprocket wheels 17 to such an extent that the fly belt 2 and the intermediate belt 6 are raised to the required working level. The pawl 22 will as stated prevent retrograde movement, and the mechanism is then ready for use.

If a jam of copies should occur as heretofore described, the pawl 22 is automatically disengaged from the ratchet wheel 21, and the unit comprising the two frames 11 and 12 and the fly belt 2 and intermediate conveyer 6 will be free to fall by gravity to some suitable limiting position as indicated in chain dotted lines in Figure 2.

To this end, said pawl 22, which is pivoted about a pivot pin 24 carried by an upstanding stationary bracket 24a is rigid with a bar 25. One end of said bar is biased by means of a spring 26 in such a direction as to keep said pawl 22 in engagement with the ratchet wheel 21. The other end of said bar 25 engages, through the medium of a ball 27 located in a cupped recess of said bar, with a cam surface 28 on the side of a longitudinally slidable member 29. In the normal position of the member 29, the spring 26 is enabled to keep the pawl 22 operatively in engagement with the ratchet wheel 21, but when said member 29 is slid to the right as seen in Figures 2 and 3 the cam surface 28 forces the bar 25 to rotate about the pivot pin 24, in opposition to the spring 26, in such a sense that the pawl 22 is lifted clear of the ratchet 21. When the member 29 is moved the full distance to the right a portion of the cam surface 28 which is normal to the pressure of the ball 27 comes into engagement with said ball and thus there is no tendency for the spring 26 to force said member 29 back to its normal position. Thus when the member 29 is pulled to the right the pawl 22 is disengaged from, and maintained away from, the ratchet 21, and the two belts 2 and 6 can fall to the safe position. As stated said rod 29 can be returned to its normal position by hand, by means of a finger extension 30.

In order that the rod 29 shall be pulled to the right when a jam of copies occurs at either of the two places referred to, two shafts 31 and 32 are rotatably mounted transversely across the side members of the frame 11 as shown. From the shaft 31 extend two identical trigger levers 33 (only one of which is seen) and from the shaft 32 extend two identical trigger levers 34. The levers 33 extend close to the region between the intermediate belt 6 and the arms 5 of the fly in such a way that if a jam of copies between the fly and the belting occurs at that region the belting will be flexed downwardly and when it is flexed beyond a given degree the copies themselves will engage and press downwardly the trigger levers 33 and the shaft 31 will be rotated counter-clockwise as seen in Figure 1. In a similar way the levers 34 extend close to the region between the fly belt 2 and the endless chains in such a way that if a jam of copies should occur at that region, the belting will be flexed downwards and said levers 34 will be forced downwards by contact with the copies and the shaft 32 will be rotated clockwise. The two shafts 31 and 32 are coupled together by means of arms 35 and 36 extending from the shafts 31 and 32 and loosely pin jointed together, in such a way that clockwise rotation of the shaft 32 produces counter-clockwise rotation of shaft 31 and vice versa. Thus if a jam occurs at either region said shaft 31 is rotated counter-clockwise. Said shaft 31 has an arm 37 extending rigidly from it, and this arm is connected, through the medium of a Bowden wire 38 to the slidable element 29 in such a way that counter-clockwise rotation of the shaft 31 causes said element 29 to be pulled to the right. Thus, if a jam occurs at either of the regions referred to, the element 29 is pulled to the right and the structure bearing the two belts 2 and 6 is permitted to drop. To reset, the finger extension 30 is pulled to the left resetting the pawl and the hand wheel 23 is rotated to rewind the chains 15 until the said structure is raised to the required level.

Other details of construction are deemed clear from the drawings.

The invention is particularly useful in combination with the inventions described and claimed in our prior specifications Nos. 508,227 and 520,765. If the copies leaving the press are first spaced on the fly belt, in accordance with the present invention, at the longer intervals referred to in prior specification No. 508,227 they can then, in accordance with said prior specification, be accurately spaced at the shorter intervals for delivery in batches or quires to the delivery conveyer. It has been found that unless the units are spaced with some degree of accuracy on the fly belt at the commencement of their travel, they may arrive at the delivery end in such a state that the mechanism described in specification No. 508,227 will have difficulty in dealing with them satisfactorily. Although considerable tolerance is permissible to the uniformity of the spacing of the copies as they arrive at the delivery end, there are limits beyond which, as stated, the mechanism of specification No. 508,227 will have difficulty in dealing with the copies.

What I claim and desire to secure by Letters Patent is:

1. In conveying and spacing apparatus for newspaper copies and the like, the combination with a rotary fly having pockets which receive the copies and from which the copies are discharged as they reach their down position, of a conveyer onto which the copies are discharged by said fly and moving means provided with spacing stops for the copies discharged onto said conveyer, said means moving said stops at a lower speed than that at which the copies are initially moved after discharge onto said conveyer, the copies being thereby caused to overtake and engage their respective stops for definite spacing of the copies on said conveyer, said conveyer comprising a section to move the copies thereon at substantially the same speed as that at which said stops move and a higher speed section through the medium of which the copies are caused to overtake said stops as aforestated.

2. In conveying and spacing apparatus for newspaper copies and the like, the combination with a rotary fly having pockets which receive the copies and from which the copies are discharged as they reach their down position, of a conveyer onto which the copies are discharged by said fly and moving means provided with spacing stops for the copies discharged onto said conveyer, said means moving said stops at a lower speed than that at which the copies are initially moved after discharge onto said conveyer, the copies being thereby caused to overtake and engage their respective stops for definite spacing of the copies on said conveyer, said conveyer comprising sections operating at different speeds, the higher speed section discharging the copies onto the lower speed section and said higher speed section being contiguous to said fly thereby to cause said fly and said higher speed section jointly to impart to the copies discharged from said fly the movement to overtake and engage said stops.

3. In conveying and spacing apparatus for newspaper copies and the like, the combination with a rotary fly having pockets which receive the copies and from which the copies are discharged when their respective pockets arrive in a given rotary position, of a conveyer onto which the copies are discharged by said fly, and endless band means carrying spacing stops for the copies discharged onto said conveyer, said means affording travel of said stops over a path contiguous to a section of said conveyer and starting at a point near the point of discharge of the copies from said fly, said conveyer section moving the copies in the same direction and at substantially the same speed as said stops are moved over said path thereof, and said conveyer having a higher speed section through the medium of which the copies in their initial movement after discharge from said fly are caused to overtake and engage their respective stops.

4. In conveying and spacing apparatus for newspaper copies and the like, the combination with a rotary fly having pockets which receive the copies and from which the copies are discharged when their respective pockets arrive in a given rotary position, of a conveyer onto which the copies are discharged by said fly, and endless band means carrying spacing stops for the copies discharged onto said conveyer, said means affording travel of said stops over a path contiguous to a section of said conveyer and starting at a point near the point of discharge of the copies from said fly, said conveyer section moving the copies in the same direction and at substantially the same speed as said stops are moved over said path thereof, and said conveyer having a higher speed section through the medium of which the copies in their initial movement after discharge from said fly are caused to overtake and engage their respective stops, said higher speed conveyer section being angularly disposed to the other section and extending into close proximity to said fly for coaction therewith to grip the copies discharged from the fly pockets and to impart to the copies the movement to overtake and engage said stops.

5. In conveying and spacing apparatus for newspaper copies and the like, the combination with a rotary fly having pockets which receive the copies and from which the copies are discharged as their respective pockets reach a given rotary position, of a conveyer onto which the copies are discharged by said fly, said conveyer comprising sections operating at different speeds and having the higher speed section arranged to convey the copies to the lower speed section, moving means carrying spacing stops for the copies discharged by said fly onto said conveyer, said means moving said stops at a speed less than the speed of movement afforded the copies by said higher speed conveyer section, said conveyer having means releasably holding it in cooperating relation with said fly and when released moving away from said fly to afford relief from jamming of the copies on the conveyer and tripping means for said conveyer holding means, said tripping means being responsive to a given degree of jamming of the copies at a given point in the travel thereof on said conveyer.

6. In conveying and spacing apparatus for newspaper copies and the like, the combination with a rotary fly having pockets which receive the copies and from which the copies are discharged as their respective pockets reach a given rotary position, of a conveyer onto which the copies are discharged by said fly, said conveyer comprising sections operating at different speeds and having the higher speed section arranged to convey the copies to the lower speed section, moving means carrying spacing stops for the copies discharged by said fly onto said conveyer, said means moving said stops at a speed less than the speed of movement afforded the copies by said higher speed conveyer section, said conveyer having means releasably holding it in cooperating relation with said fly and when released moving away from said fly to afford relief from jamming of the copies on the conveyer, and tripping means for said conveyer holding means, said tripping means comprising parts to detect jamming of the copies at any one of a number of points in the travel of the copies and to effect tripping of said holding means upon a predetermined degree of jamming of the copies at any one of such points.

7. In conveying and spacing apparatus for newspaper copies and the like, the combination with a rotary fly having pockets which receive the copies and from which the copies are discharged as their respective pockets reach a given rotary position, of a conveyer onto which the copies are discharged by said fly, said conveyer comprising sections operating at different speeds and having the higher speed section arranged to convey the copies to the lower speed section, moving means carrying spacing stops for the copies discharged by said fly onto said conveyer, said means moving said stops at a speed less than the speed of movement afforded the copies by said higher speed conveyer section, said conveyer having means releasably holding it in cooperating relation with said fly and when released moving away from said fly to afford relief from jamming of the copies on the conveyer, said holding means comprising a ratchet wheel and locking pawl therefor, and tripping means for said pawl comprising means responsive to a given degree of jamming of the copies at a given point in the travel of the copies carried thereby.

8. In conveying and spacing apparatus for newspaper copies and the like, the combination with a rotary fly having pockets which receive the copies and from which the copies are discharged as their respective pockets reach a given rotary position, of a conveyer onto which the copies are discharged by said fly, said conveyer comprising sections operating at different speeds and having the higher speed section arranged to convey the copies to the lower speed section, moving means carrying spacing stops for the copies discharged by said fly onto said conveyer, said means moving said stops at a speed less than the speed of movement afforded the copies by said higher speed conveyer section, said conveyer having means releasably holding it in cooperating relation with said fly and when released moving away from said fly to afford relief from jamming of the copies on the conveyer, said holding means comprising a ratchet wheel and locking pawl therefor, and tripping means for said pawl comprising an arm having a flexible connection with said pawl and a plurality of actuating elements for said arm respectively extending into proximity with said conveyer sections to detect jamming of the copies on either section and to trip said holding means upon a predetermined degree of jamming of the copies.

HAROLD H. RAPLEY.